Patented Aug. 20, 1929.

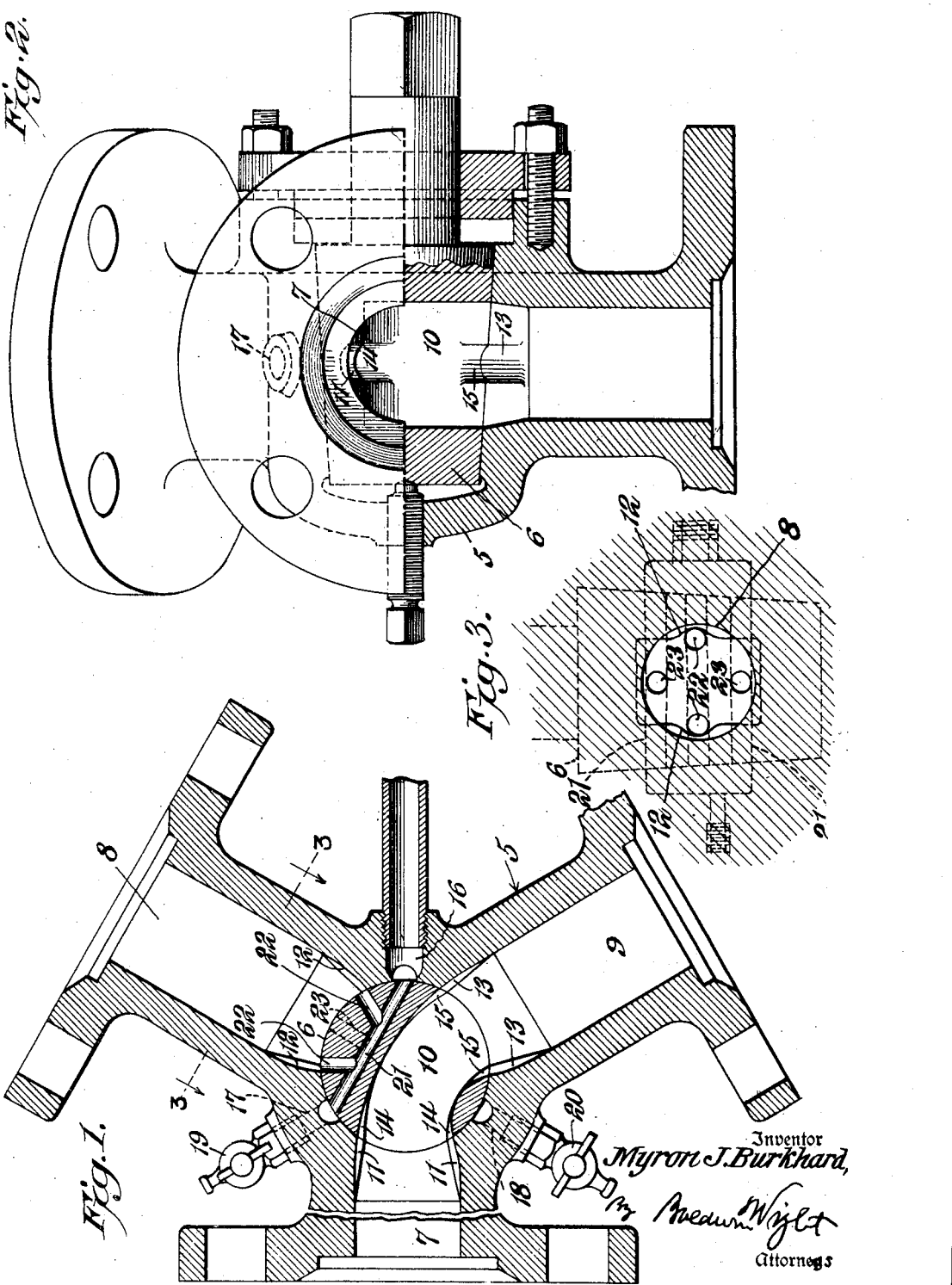

1,725,337

UNITED STATES PATENT OFFICE.

MYRON J. BURKHARD, OF KANSAS CITY, KANSAS, ASSIGNOR TO WHITE EAGLE OIL AND REFINING COMPANY, OF KANSAS CITY, MISSOURI.

VALVE.

Application filed May 3, 1928. Serial No. 274,833.

This invention relates to new and useful improvements in valves generally, although the invention is particularly intended for use in connection with valves employed in oil refineries, oil lines, etc.

In valves, such as diversion valves, valves of oil lines in refineries or analogous installations, the settling of carbon or coke in the valve causes sticking, clogging, etc., while in valves serving in water systems cavitation frequently results, thus materially reducing the longevity and efficiency of the valve. The cavitation of the valve parts and the depositing of coke, carbon or other sediments in the valve is due largely to the same action found in the valves regardless of the type of fluid passing therethrough, and this is particularly true of what is known as a 2-way valve, since the fluid flowing into the valve at a high velocity is deflected in its direction of flow by the valve, and forms or leaves vacuous spaces at certain positions in the valve. These vacuous spaces have a materially lower pressure than the pressure of the fluid surrounding them. The coke, carbon, or other foreign elements which is carried along with the fluid when the latter is of the petroleum type, leaves the flowing fluid and enters the low pressure or vacuous areas and becomes tightly packed therein. This results in the clogging of the valve at these points. When water, particularly hot water, under a relatively high velocity is flowing through a valve of this type, oxygen will be released at the vacuous or low pressure spaces and by collecting therein will act on the parts of the valves exposed to the low pressure areas, resulting in what is commercially known as cavitation or pitting of the valve parts; that is, the eating away or honeycombing of the metal which weakens the valve, decreases its life and affects its efficiency.

The principal object of this invention is to provide a valve structure which will obviate the above defects by rendering the valve non-clogging and self-cleaning.

In the accompanying drawing

Fig. 1 is a sectional view of a 2-way valve constructed in accordance with my invention.

Fig. 2 is an elevation at right angles to Fig. 1, parts thereof being shown in section, and Fig. 3 is a detail sectional view taken on the line 3—3 of Fig. 1.

Referring to the drawing, I have illustrated a 2-way valve comprising a casing 5 and a rotary valve or plug 6, the casing being provided with three radially disposed passages arranged 120 degrees apart and comprising an inlet passage 7 and outlet passages 8 and 9. The valve or plug 6 is provided with a transversely disposed arcuate passage 10 which is adapted to register with the inlet passage 7 and with either of the outlet passages 8 or 9.

A plurality of grooves 11, 12 and 13 are respectively formed in the wall of each of the passages 7, 8 and 9 adjacent the inner ends thereof. These grooves extend longitudinally of the passages, or, in other words, extend in the direction of or parallel to the flow of the fluid passing through the valve structure. Respectively formed in the ends of the wall forming the passage 10 of the valve or plug 6 is a plurality of grooves 14 and 15 which extend longitudinally of said passage 10.

The grooves 14 and 15 of the valve are adapted to align with the grooves 11 and 12 of the inlet passage 7 and the outlet passage 8 or with the grooves 11 and 13 of the inlet passage 7 and outlet passage 9, and thereby form continuations of said grooves 11 and 12 or 11 and 13, depending of course upon the position of the valve 6.

From the above it will be observed that I have provided a valve structure embodying grooves in the valve ports which extend parallel to the flow of the fluid through the valve and through the portions of the valve wherein low pressure areas are formed. These grooves serve to direct a part of the fluid flowing through the valve through such low pressure areas in that the grooves begin at a point remote from the directional changing portions of the valve. The fluid flowing through the grooves will break up the low pressure areas and prevent the depositing of foreign material therein when a fluid such as petroleum is flowing through the valve or plug and will prevent the accumulation of oxygen and the resulting pitting of the valve when either water or analogous fluid is flowing therethrough.

My invention also includes means for flushing the grooves to prevent or remove the accumulation of petroleum products therein. To this end I have provided the valve casing at a point intermediate the outlet passages 8 and 9 with an inlet port 16 for steam, air or other purgative. The casing intermediate the inlet passage 7 and the outlet passages 8 and 9 is formed with exhaust ports 17 and 18 respectively, which are adapted to be opened or closed by hand operated external valves 19 and 20 respectively. The valve 6 is provided with a transverse passage 21 adapted to communicate with the inlet port 16 and with either of the exhaust ports 17 or 18 depending on the position of the valve. The valve 6 is also provided with four outlet ports 22, 22 and 23, 23 which communicate with the passage 21 and with either of the outlet passages 8 or 9. The ports 22, 22 in one position of the valve respectively register with the grooves 12, 12 of the outlet passage 8 and the ports 23, 23 open into the passage 8 intermediate said grooves. In the other position of the valve, the ports 22, 22 register with grooves 13, 13 of the outlet passage 9 and the ports 23, 23 open into the passage 9 intermediate said grooves.

In operation, assuming the valve to be in the position shown in Fig. 1, the external valve 19 will be first operated whereby the steam will be directed through the passage 21 to clean the latter of oil or other matter. The valve 19 will be then closed and the steam will be directed outwardly through the ports 22 and 23, the steam from the ports 22 serving to prevent or remove any accumulation of petroleum products from the grooves 12, 12 of the outlet passage 8, and the ports 23 serving to emit steam adjacent the wall of the passage 8 at points intermediate the grooves 12 and thereby assist in preventing petroleum products from accumulating on the wall of said passage 8. When the valve is turned to register the valve passage 10 with the inlet passage 7 and the outlet passage 9, the same general action as above described takes place. Thus the flushing ducts or passages of the valve are brought into communication with the grooves in the inactive outlet passage only of the valve casing whereby said grooves and the wall of the outlet passage will be thoroughly cleaned.

I claim:

1. In a valve having a fluid passage with directional changing portions therein, said valve being provided with grooves extending parallel to the direction of flow of the fluid through the valve for breaking up and preventing the formation of low pressure areas within the valve.

2. In a valve, a valve casing, a movable member for controlling the flow of fluid through the valve, said movable member and casing being provided with grooves adapted to register at predetermined times and arranged to prevent the formation of low pressure areas in the fluid passages of the valve.

3. In a valve, a valve casing, a movable member for controlling the flow of fluid through the valve, said movable member and casing being provided with grooves adapted to register at predetermined times and arranged to prevent the formation of low pressure areas in the fluid passages of the valve, said movable member being provided with flushing passages for directing a purging agent through certain of the grooves when the corresponding portion of the fluid passage is inactive.

4. In a valve, the combination of a casing including an inlet passage and a pair of outlet passages, and a rotary valve mounted in said casing and provided with a passage for communication with the inlet passage and with either of the outlet passages, the inner ends of the walls forming the inlet and outlet passages being respectively provided with grooves extending longitudinally of said passages, the outer ends of the walls forming the valve passage being provided with grooves extending longitudinally of said passage and adapted to align with the grooves of the inlet passage and the grooves of either of the outlet passages.

5. In a valve, the combination of a casing including an inlet passage and a pair of outlet passages, and a rotary valve mounted in said casing and provided with a passage for communication with the inlet passage and with either of the outlet passages, the inner ends of the walls forming the inlet and outlet passages being respectively provided with grooves extending longitudinally of said passages, the outer ends of the walls forming the valve passage being provided with grooves extending longitudinally of said passage and adapted to align with the grooves of the inlet passage and the grooves of either of the outlet passages, said casing and valve being respectively formed with steam passages for directing steam into the grooves of the inactive outlet passage.

6. In a valve, the combination of a casing including an inlet passage and a pair of outlet passages, and a rotary valve mounted in said casing and provided with a passage for communication with the inlet passage and with either of the outlet passages, the inner ends of the walls forming the inlet and outlet passages being respectively provided with grooves extending longitudinally of said passages, the outer ends of the walls forming the valve passage being provided with grooves extending longitudinally of said passage and adapted to align with the grooves of the inlet passage and the grooves of either of the outlet passages, said casing and valve being respectively formed with steam passages for directing steam into the grooves of the inactive outlet passage and into said inactive outlet passage at points intermediate the grooves thereof.

7. In a valve, the combination of a casing including an inlet passage and a pair of outlet passages, and a rotary valve mounted in said casing and provided with a passage for communication with the inlet passage and with either of the outlet passages, the inner ends of the walls forming the inlet and outlet passages being respectively provided with grooves extending longitudinally of said passages, the outer ends of the walls forming the valve passage being provided with grooves extending longitudinally of said passage and adapted to align with the grooves of the inlet passage and the grooves of either of the outlet passages, said casing being provided with a steam inlet port intermediate the two outlet passages and with steam exhaust ports respectively located intermediate the inlet passage and the outlet passages, and external valves for controlling the exhaust ports, said rotary valve being provided with a steam passage adapted to communicate with the steam inlet port and with either of said steam exhaust ports, said valve being also provided with steam outlet ports adapted to communicate with the stem passage and with the grooves of either of the outlet passages.

In testimony whereof, I have hereunto subscribed my name.

MYRON J. BURKHARD.